United States Patent
Durocher et al.

(10) Patent No.: US 8,573,603 B2
(45) Date of Patent: Nov. 5, 2013

(54) SPLIT RING SEAL WITH SPRING ELEMENT

(75) Inventors: Eric Durocher, Vercheres (CA); John Pietrobon, Outremont (CA)

(73) Assignee: Pratt & Whitney Canada Corp., Longueil, Quebec (CA)

( * ) Notice: Subject to any disclaimer, the term of this patent is extended or adjusted under 35 U.S.C. 154(b) by 0 days.

(21) Appl. No.: 13/459,326

(22) Filed: Apr. 30, 2012

(65) Prior Publication Data

US 2012/0211949 A1 Aug. 23, 2012

Related U.S. Application Data

(62) Division of application No. 12/405,280, filed on Mar. 17, 2009, now Pat. No. 8,186,692.

(51) Int. Cl.
*F16J 15/02* (2006.01)

(52) U.S. Cl.
USPC ............................ 277/631; 277/641; 277/647

(58) Field of Classification Search
USPC .................. 277/631, 641, 647, 545, 578, 486
See application file for complete search history.

(56) References Cited

U.S. PATENT DOCUMENTS

| | | | |
|---|---|---|---|
| 498,736 | A | 5/1893 | Beaupre |
| 657,979 | A | 9/1900 | Crone |
| 1,344,342 | A | 6/1920 | Hanson |
| 1,382,465 | A | 6/1921 | Bramberry |
| 1,657,318 | A | 1/1928 | Price |
| 2,598,094 | A | 5/1952 | Augereau |
| 3,309,096 | A | 3/1967 | Inka |
| 4,279,424 | A | 7/1981 | Zerlauth |
| 4,477,086 | A | 10/1984 | Feder et al. |
| 4,759,555 | A | 7/1988 | Halling |
| 5,678,830 | A | 10/1997 | Chang |
| 6,145,840 | A | 11/2000 | Pope |
| 6,179,339 | B1 | 1/2001 | Vila |
| 6,199,871 | B1 | 3/2001 | Lampes |
| 6,352,267 | B1 | 3/2002 | Rode |
| 6,719,296 | B2 | 4/2004 | Brauer et al. |
| 6,905,144 | B2 | 6/2005 | Vila |
| 7,267,330 | B1 | 9/2007 | Fleming et al. |

*Primary Examiner* — Vishal Patel
*Assistant Examiner* — Nicholas L Foster
(74) *Attorney, Agent, or Firm* — Norton Rose Fulbright Canada LLP

(57) ABSTRACT

A split ring seal assembly includes a metal seal ring having two ends defining a circumferential gap therebetween. At least a first spring element is mounted to the two ends to bias the two ends circumferentially towards each other to reduce the diameter of a circumferential inner sealing surface of the metal seal ring.

9 Claims, 4 Drawing Sheets

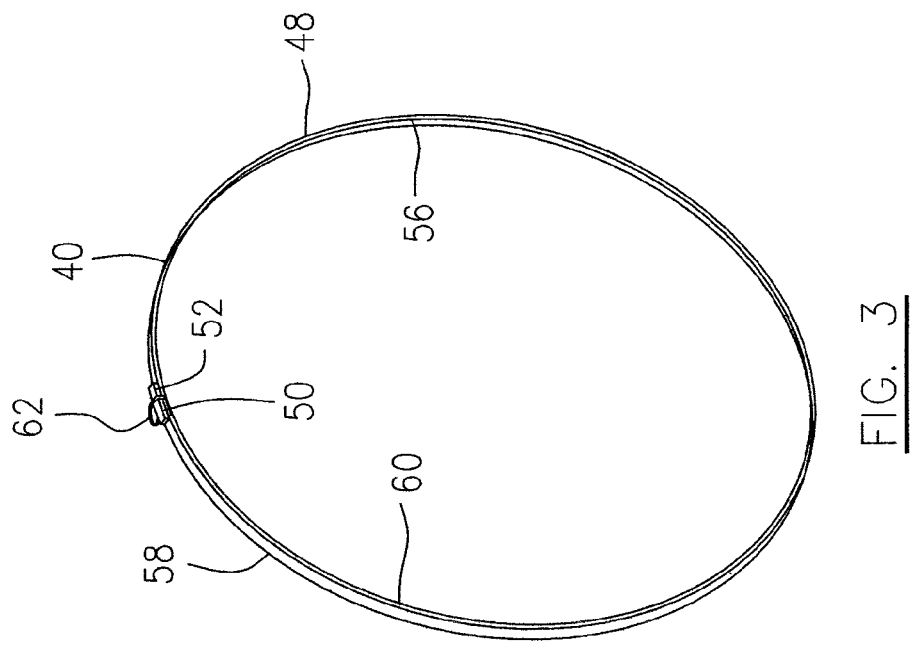
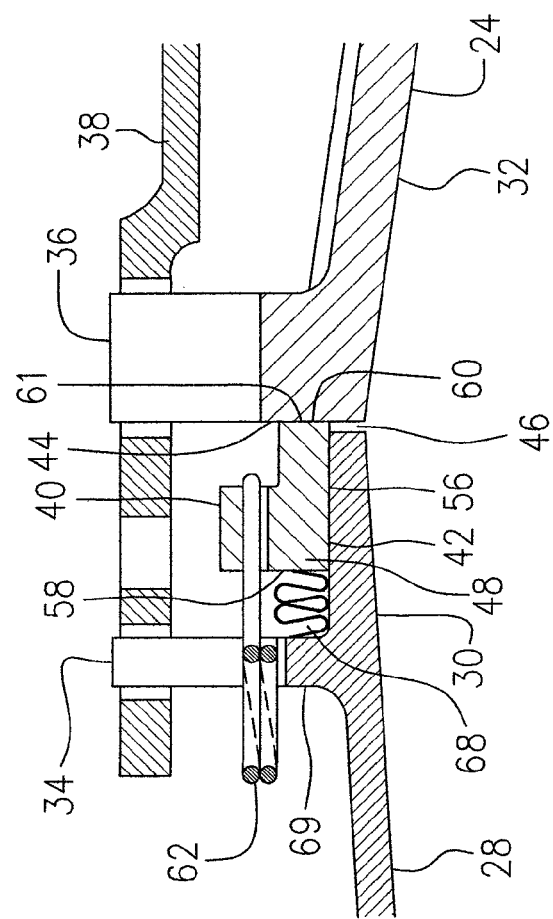
FIG. 3
FIG. 2

SPLIT RING SEAL WITH SPRING ELEMENT

CROSS-REFERENCE TO RELATED APPLICATION

This is a Division of Applicant's U.S. patent application Ser. No. 12/405,280, filed Mar. 17, 2009.

TECHNICAL FIELD

The described concept relates generally to gas turbine engines, and more particularly, to seals used therein.

BACKGROUND OF THE ART

Gas turbine engines are formed of stator components which are suitably joined together to define working fluid paths for directing for example, compressed air, hot combustion gases, etc. therethrough. Various types of static seals must be provided between the stator components to reduce or prevent undesirable leakage of either the pressurized air or the hot combustion gases. Some seals are full rings, or may be circumferentially split at one location to eliminate undesirable hoop stress therein. The seals are subject to various differential thermal movement between the adjoining components, including differential radial and/or axial movement. Relative radial and axial deflections are common between the aft end of the combustor outer liner and the forward end of the outer band of the adjoining high pressure turbine nozzle. Under the high temperature of the combustion gases produced in the combustor, the outer liner can expand radially outwardly, significantly more than the radially outer expansion of the outer end of the adjoining high pressure turbine nozzle. Furthermore, the axial gap between the two components may also grow substantially larger during operation.

Accordingly, there is a need to provide an improved sealing ring for sealing high excursion differential radial and axial movement between gas turbine engine stator components.

SUMMARY OF THE INVENTION

In one aspect, there is provided a split ring seal assembly for a gas turbine engine comprising: a first stator ring and a second stator ring of the engine, the first stator ring having a circumferentially extending first radial surface and the second stator ring having a circumferentially extending second radial surface, the first and second radial surfaces being axially spaced apart, thereby defining an axial gap therebetween; a seal ring disposed around the first and second stator rings of the engine for sealing the axial gap, the seal ring being made of a metal material and having first and second ends defining a circumferential gap between the two ends, the seal ring defining an axially extending circumferential inner sealing surface extending axially between opposed first and second axial sides of the seal ring, the circumferential inner sealing surface having an axial dimension in radial contact with both an axially extending first outer circumferential surface of the first stator ring and an axially extending second outer circumferential surface of the second stator ring, thereby sealing the axial gap; and a spring element connected to and applying circumferential spring forces to the respective first and second ends of the seal ring, to bias the two ends circumferentially towards each other, thereby reducing the diameter of the seal ring to secure the seal ring in position.

Further details of these and other aspects of the present described concept will be apparent from the detailed description and drawings included below.

DESCRIPTION OF THE DRAWINGS

Reference is now made to the accompanying drawings depicting aspects of the described concept, in which:

FIG. 2 is a partial schematic cross-sectional view of the gas turbine engine in FIG. 1, showing the circled area indicated by numeral 2 in which a split ring seal assembly is employed according to one embodiment;

FIG. 3 is a perspective view of a seal ring used in the split ring seal assembly of FIG. 2;

DETAILED DESCRIPTION OF THE PREFERRED EMBODIMENTS

Figure 1:
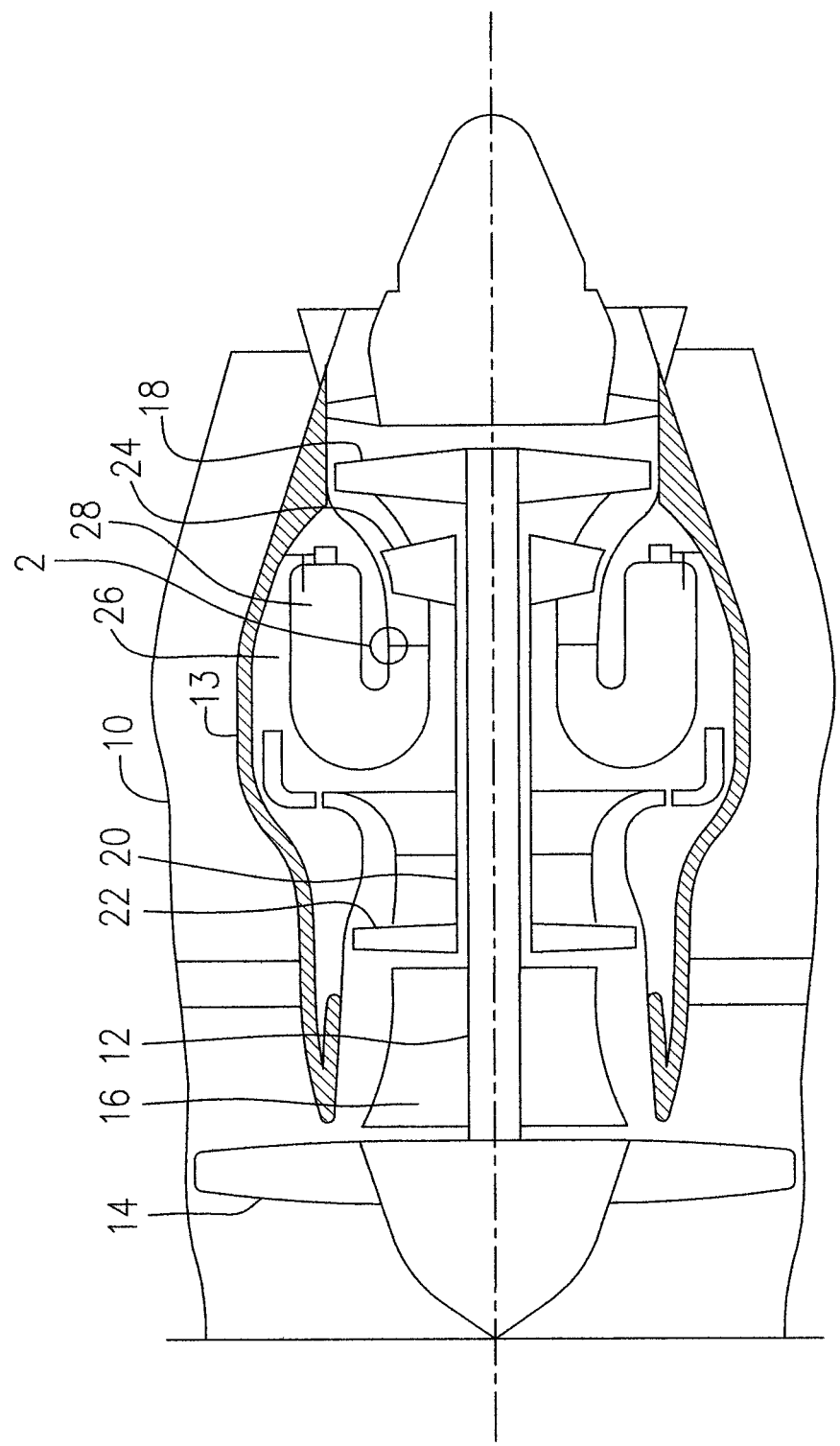
FIG. 1 is a schematic cross-sectional view of a turbofan gas turbine engine as an application of the described concept.

Referring to FIG. 1, a turbofan gas turbine engine presented as an example of the application of the described concept, includes a housing 10, a core casing 13, a low pressure spool assembly seen generally at 12 which includes a fan assembly 14, a low pressure compressor assembly 16, a low pressure turbine assembly 18, and a high pressure spool assembly seen generally at 20 which includes a high pressure compressor assembly 22 and a high pressure turbine assembly 24. The core casing 13 surrounds the low and high pressure spool assemblies 12 and 20 in order to define a main fluid path (not numbered) therethrough. In the main fluid path there is provided a combustor 28 to constitute a gas generator section 26.

Referring to FIGS. 1-5 a vane stator shroud 32 of the high pressure turbine assembly 24 is positioned downstream of a gas exit end 30 of the combustor 28, as more clearly shown in FIG. 2. The combustor 28 and the vane stator shroud 32 are provided with a plurality of radially extending support elements 34, 36, respectively which are engaged with a stationary support structure 38 of the engine to retain the combustor 28 and the vane stator shroud 32 in axial positions adjacent to each other. Therefore, combustion gases produced in the combustor 28 are discharged from the gas exit end 30, to flow into the vane stator shroud 32 in order to power the turbine (not numbered) of the high pressure turbine assembly 24. A split ring seal assembly 40 according to one embodiment, is seated on a circumferential outer surface 42 of the gas exit end 30 of the combustor 28, to abut a radial end surface 44 defined on a forward end of the vane stator shroud 32, thereby sealing an axial clearance 46 between the gas exit end 30 of the combustor 28 and the vane stator shroud 32 of the high pressure turbine assembly 24.

Figure 4:
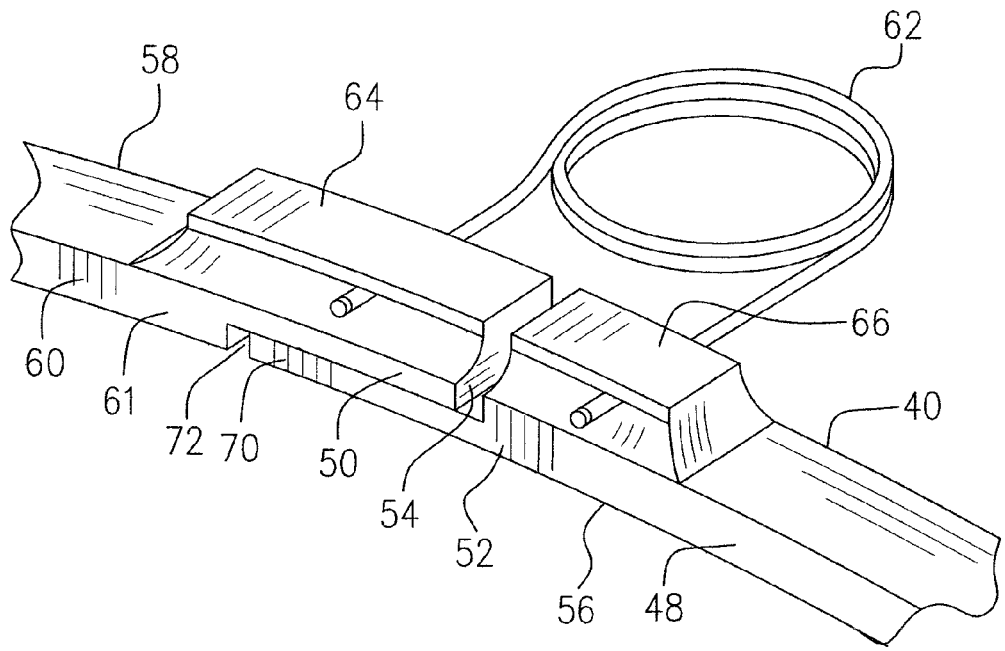
FIG. 4 is a partial perspective view of the seal ring of FIG. 3, showing two ends of the seal ring with a first spring element mounted thereon.
Figure 5:
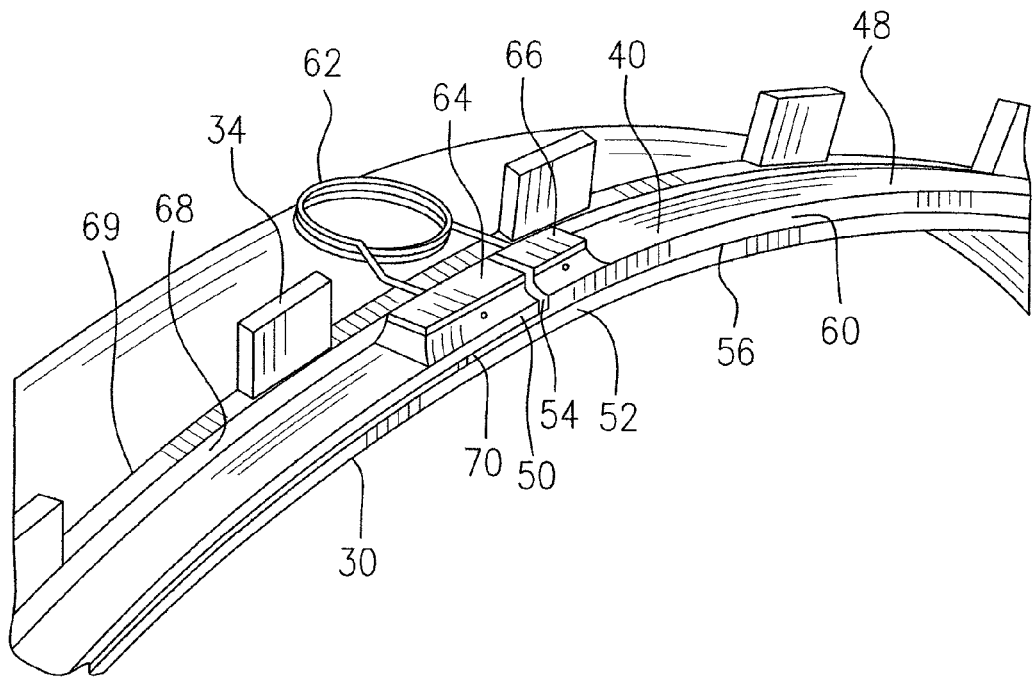
FIG. 5 is a partial perspective view of the split ring seal assembly of FIG. 2, showing the seal ring positioned around a gas exit end of a combustor with first and second spring elements attached thereto to apply circumferential and axial spring forces to the seal ring, respectively.

The split ring seal assembly 40 according to this embodiment, includes a seal ring 48 made of metal material (see FIGS. 3-5). The metal seal ring 48 is a type of split ring and has two ends 50, 52 defining the circumferential gap 54 therebetween. The metal seal ring 48 defines a circumferential inner sealing surface 56 along the inner circumferential side thereof, extending axially between opposed axial sides 58, 60 of the metal seal ring 48. The circumferential inner sealing surface 56 of the metal seal ring 48 is adapted to radially contact the circumferential outer surface 42 of the gas exit end 30 of the combustor 28. The metal seal ring 48 further defines a radial end sealing surface 61 on one of the two axial sides, such as axial side 60, for axially contacting the radial end surface 44 of the vane stator shroud 32.

The split ring seal assembly 40 includes means for biasing the ends 50, 52 of the metal seal ring 48 circumferentially towards each other, in order to reduce the diameter of the circumferential inner sealing surface 56 and to radially compress the circumferential inner sealing surface 56 onto the circumferential outer surface 42 of the gas exit end 30 of the combustor 28, thereby assuring a firm radial contact between the two components to avoid formation of gas passages therebetween. For example, the means may comprise a torsion spring 62 mounted to the respective ends 50, 52 of the metal seal ring 48. For convenience of mounting the torsion spring 62, the two ends 50, 52 of the metal seal ring 48 may be provided with respective integral lands 64, 66 radially outwardly projecting from ends 50, 52, which define mounting holes (not numbered), for example, axially extending through the lands to engage two free ends (not numbered) of torsion spring 62. The torsion spring 62 may be pre-tensioned by forcing the two ends thereof away from each other to align with the mounting holes in the respective lands 64, 66 when the torsion spring 62 is mounted to the split ring assembly 40. Therefore, the pre-tensioned torsion spring 62 biases the two ends 50, 52 of the metal seal ring 48 circumferentially towards each other.

The split ring seal assembly 40 is also provided with, in accordance with this embodiment, means for biasing the metal seal ring 48 axially towards the vane stator shroud 32, in order to press the radial end sealing surface 61 against the radial end surface 44 of the vane stator shroud 32. For example the means may comprise an annular wave spring ring 68 which has a spring-shaped axial cross section as shown in FIG. 2. The annular wave spring ring 68 is positioned around the gas exit end 30 of the combustor 28 and is axially located between a flange 69 which extends radially and outwardly from the gas exit end 30 of the combustor 28, and the axial side 58 of the metal seal ring 48, in a pre-axially pressed condition. Therefore, the annular wave spring ring 68 abuts the flange 69 of the combustor 28 and biases the metal seal ring 48 towards and against the radial end surface 44 of the vane stator shroud 32. Under the axial spring force of the annular wave spring ring 68, the radial end sealing surface 61 of the metal seal ring 48 firmly axially contacts the radial end surface 44 of vane stator shroud 32 to thereby avoid formation of gas passages therebetween.

Due to the radial sealing between the circumferential inner sealing surface 56 of the metal seal ring 48 and the circumferential outer surface 42 of the gas exit end 30 of the combustor 28, and also due to the axial sealing between the radial end sealing surface 61 of the metal seal ring 48 and the radial end surface 44 of the vane stator shroud 32, the axial clearance 46 between the gas exit end 30 of the combustor 28 and the forward end of the vane stator shroud 32 is therefore sealed.

The torsion spring 62, which may be located at the axial side 58 of the metal seal ring 48 as is the annular wave spring 68, may be alternatively replaced by a spring element of any type which applies a pair of spring forces to the respective ends 50, 52 of the metal seal ring 48 in order to bias the respective ends 50, 52 circumferentially towards each other, such as coil springs, leaf springs, spring clips, etc. The annular wave spring ring 68 may be replace alternatively by a spring ring of another type such as having a U-shaped or V-shaped axial cross section, or may be alternatively replaced by a plurality of spring elements which may be axially pressed to bias the metal spring ring 48 axially towards the vane stator shroud 32. For example, three or four such axial pressing spring elements may be positioned circumferentially equally spaced apart one from another. Positioning and retaining means may be provided with either the gas exit end 30 of the combustor 28 or with the metal seal ring 48 for maintaining the circumferential evenly spaced positions of the individual axial pressing spring elements.

It should be noted that due to the radial and circumferential thermal expansion of the gas exit end 30 of the combustor 28 during engine operation, the two ends 50 and 52 of the metal seal ring 48 may be forced away from each other such that the circumferential gap 54 between the two ends 50 and 52 increases. Therefore, it is optional according to another embodiment to provide an overlap joint 70 to close the circumferential gap 54.

The overlap joint 70 which is like a flat tongue member having a relatively thin thickness with respect to the radial thickness of the metal seal ring 48, may be integrated with and extend from the end 52 at the inner circumferential side of the metal seal ring 48, circumferentially over the gap 54. The metal seal ring 48 further defines a radial recess 72 on the inner circumferential side of the metal seal ring 48 at the end 50. The overlap joint 70 extends circumferentially from the end 52, into the radial recess 72. The radial recess 72 has a radial dimension substantially equal to the thickness of the overlap joint 70 such that the inner surface of the overlap joint 70 is located in a radial position substantially determined by the diameter of the circumferential inner sealing surface 56 of the metal seal ring 48, thereby forming part of the circumferential inner sealing surface 56 of the metal seal ring 48. A side surface (not numbered) of the overlap joint 70 also forms part of the radial end sealing surface 61 on the axial side 60 of the metal seal ring 48. Therefore, in a working condition the overlap joint 70 as part of the metal seal ring 48, also firmly radially contacts the circumferential outer surface 42 of the gas exit end 30 of the combustor 28 and firmly axially contacts the radial end surface 44 of the vane stator shroud 32.

The radial recess 72 may have a circumferential dimension greater than a circumferential dimension of the overlap joint 70, in order to define a gap (not numbered) between a free end (not numbered) of the overlap joint 70 and an end wall (not numbered) of the radial recess 72. As a result, the gap between the free end of the overlap joint 70 and the end wall of the radial recess 72 is greater than the circumferential gap 54 between the two ends 50 and 52 of the metal seal ring 48 to thereby avoid interference with a relative motion between the two ends 50 and 52 under the spring forces of the torsion spring 62 when thermal expansion of the gas exit end 30 of the combustor 28 changes.

The torsion spring 62 and the annular wave spring ring 68 provide respective circumferential and axial loads to the metal seal ring 48 and keep the seal ring in firm radial and axial contact with the respective combustor 28 and the vane stator shroud 32, and furthermore, provide some degree of flexibility of the metal seal ring 48 for the thermal growth at any running condition of the engine, without incurring "creep" issues due to the rigid connections of conventional split ring seal assemblies. The overlap joint 70 is used to minimize gas leakages through the split area of the metal seal ring 48.

The metal seal ring 48 contacts the combustor 28 and the vane stator shroud 32 in different directions (radial and axial). Therefore, different radial thermal expansions of the combustor 28 and the vane stator shroud 32 do not affect the sealing result provided by the metal seal ring 48. Nevertheless, the metal seal ring 48 may be used in other sealing arrangements.

Figure 6:
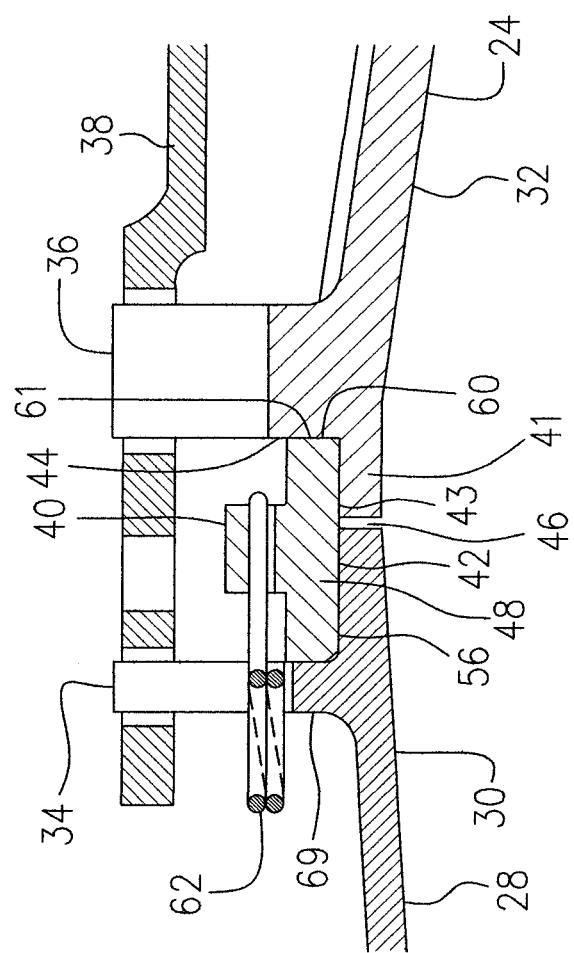
FIG. 6 is a view of a split ring seal assembly similar to FIG. 2, according to a further embodiment.

FIG. 6 illustrates another application of the split ring seal assembly 40 according to a further embodiment. Components and features shown in FIG. 6 which are similar to those shown in FIGS. 1-5, are indicated by similar reference numerals, and will not be redundantly described. The metal seal ring 48 according to this embodiment, has an axial dimension for radially contacting both the circumferential outer surface 42 of the gas exit end 30 of the combustor 28 and a circumferential outer surface 43 of the vane stator shroud 32, to thereby seal an axial clearance 46 between the gas exit end 30 of the combustor 28 and the vane stator shroud 32. In particular, the circumferential outer surface 43 is defined on an axial flange 41 extending forwardly from the forward end of the vane stator shroud 32, and has a diameter substantially equal to the diameter of the circumferential outer surface 42 of the gas exit end 30 of the combustor 28. The axial clearance 46 is located axially between the gas exit end 30 of the combustor 28 and the axial flange 41 of the vane stator shroud 32 when the vane stator shroud 32 is positioned downstream of and adjacent to the combustor 28. The metal seal ring 48 is axially positioned and restrained between the radial flange 69 of the combustor 28 and the radial end surface 44 of the vane stator shroud 32. Therefore, the annular wave spring ring 68 shown in FIG. 2 or the like is not needed because only radial compressions are required for radially contacting both the circumferential outer surfaces 42 and 43 of the respective combustor 28 and the vane stator shroud 32.

The above description is meant to be exemplary only and one skilled in the art would recognize that changes may be made to the embodiments described without departure from the described concept. For example, the split ring seal assembly is described to seal the axial clearance between a combustor and a vane stator shroud of a high pressure turbine assembly according to the described embodiments, however, the split ring seal assembly may be used for sealing axial gaps between two annular gas turbine engine components of all types, such as annular components used in fan assembly, high or low pressure compressor assemblies and in high or low pressure turbine assemblies of gas turbine engines. The split ring seal assembly may be used in gas turbine engines of any type although a turbofan gas turbine engine is used as an exemplary application of the split ring seal assembly. Other modifications which fall within the scope of the described concept will be apparent to those skilled in the art, in light of a review of this disclosure and such modifications are intended to fall within the appended claims.

The invention claimed is:

1. A split ring seal assembly for a gas turbine engine comprising:
a first stator ring and a second stator ring of the engine, the first stator ring having a circumferentially extending first radial surface and the second stator ring having a circumferentially extending second radial surface, the first and second radial surfaces being axially spaced apart, thereby defining an axial gap therebetween;
a seal ring disposed around the first and second stator rings of the engine for sealing the axial gap, the seal ring being made of a metal material and having first and second ends defining a circumferential gap between the two ends, the seal ring defining an axially extending circumferential inner sealing surface substantially perpendicular to and terminating respectively on opposed first and second axial sides of the seal ring, the circumferential inner sealing surface being in radial contact with both an axially extending first outer circumferential surface of the first stator ring and an axially extending second outer circumferential surface of the second stator ring, thereby sealing the axial gap, the first outer circumferential surface being substantially perpendicualr to the first radial surface of the first stator ring and the second outer circumferential surface being substantially perpendicular to the second radial surface of the second stator ring; and
a spring element connected to and applying circumferential spring forces to the respective first and second ends of the seal ring, to bias the two ends circumferentially towards each other, thereby reducing the diameter of the seal ring to secure the seal ring in position.

2. The split ring seal assembly as defined in claim 1 wherein the axially extending first outer circumferential surface terminates on the circumferentially extending first radial surface and on a circumferentially extending third radial surface of the first stator ring, respectively, and wherein the axially extending second outer circumferential surface terminates on the circumferentially extending second radial surface and on a circumferentially extending fourth radial surface of the second stator ring, respectively.

3. The split ring seal assembly as defined in claim 2 wherein the seal ring is positioned axially between, and is axially restrained by the third and fourth radial surfaces of the respective first and second stator rings.

4. The split ring seal assembly as defined in claim 3 wherein the spring element is positioned at one of the axial sides of the seal ring.

5. The split ring seal assembly as defined in claim 1 wherein the spring element comprises a torsion spring having two ends releaseably engaged with the respective two ends of the seal ring.

6. The split ring seal assembly as defined in claim 1 wherein the seal ring comprises an extension integrated with the first end of the seal ring and extending circumferentially over the gap between the two ends of the seal ring.

7. The split ring seal assembly as defined in claim 6 wherein the seal ring defines a radial recess on a radial inner side of the second end of the seal ring for receiving the extension extending from the first end of the seal ring, the extension forming part of the circumferential inner sealing surface.

8. The split ring seal assembly as defined in claim 7 wherein the first and second ends of the seal ring each comprise a land projecting radially outwardly from the respective first and second end, each of the lands defining a mounting hole for engagement with the first spring element.

9. The split ring seal assembly as defined in claim 8 wherein the land radially outwardly projecting from the second end has a circumferential dimension greater than a circumferential dimension of the radial recess.

* * * * *